(12) United States Patent
Wullert, II (10) Patent No.: US 6,968,052 B2
(45) Date of Patent: Nov. 22, 2005

(54) METHOD AND APPARATUS FOR CREATING A PRESENCE MONITORING CONTACT LIST WITH DYNAMIC MEMBERSHIP

(75) Inventor: John R. Wullert, II, Martinsville, NJ (US)

(73) Assignee: Telecordia Technologies, Inc., Piscataway, NJ (US)

( * ) Notice: Subject to any disclaimer, the term of this patent is extended or adjusted under 35 U.S.C. 154(b) by 532 days.

(21) Appl. No.: 09/768,417

(22) Filed: Jan. 24, 2001

(65) Prior Publication Data

US 2002/0097856 A1 Jul. 25, 2002

(51) Int. Cl.$^7$ .............................................. H04M 3/42
(52) U.S. Cl. .......................... 379/210.01; 379/88.17; 379/93.23; 379/142.08; 379/215.01
(58) Field of Search ..................... 379/88.17, 88.19, 379/88.2, 88.21, 93.23, 142.08, 207.12, 207.15, 210.01, 215.01, 265.09, 900, 908

(56) References Cited

U.S. PATENT DOCUMENTS

| | | | | |
|---|---|---|---|---|
| 5,185,782 | A | * | 2/1993 | Srinivasan .............. 379/210.01 |
| 6,144,644 | A | * | 11/2000 | Bajzath et al. ............... 370/259 |
| 6,169,795 | B1 | * | 1/2001 | Dunn et al. ............ 379/209.01 |
| 6,310,947 | B1 | * | 10/2001 | Polcyn ................... 379/211.01 |
| 6,311,231 | B1 | * | 10/2001 | Bateman et al. ........ 379/265.09 |
| 6,456,711 | B1 | * | 9/2002 | Cheung et al. ........ 379/265.09 |

* cited by examiner

*Primary Examiner*—Bing Q. Bui
(74) *Attorney, Agent, or Firm*—Joseph Giordano; James W. Falk (57) ABSTRACT

Method and apparatus to generate a dynamic contact list of contact and presence information about contact events in a communication system when a calling entity unsuccessfully attempts to communicate with a called entity. When such a contact event occurs, a routing processor or call agent generates contact information about the contact event, including the calling party, called party, time of the contact event, and purpose of the contact event. A presence management processor also generates the presence information about the calling party's subsequent availability for return communication, including if a calling party is available for return communication, when the calling party is available for return communication, how long the calling party is available for return communication, and how the calling party is available for return communication. This contact and presence information is displayed to the called party in a dynamic contact list that includes contact and presence information for a plurality of contact events and calling parties, respectively. The called party is thereby able to determine what contact events occurred while the called party was unavailable for communication, and in what manner to return communicate with those calling parties that attempted to communicate with the called party while it was unavailable.

11 Claims, 3 Drawing Sheets

METHOD AND APPARATUS FOR CREATING A PRESENCE MONITORING CONTACT LIST WITH DYNAMIC MEMBERSHIP

FIELD OF THE INVENTION

The present invention generally relates to electronic communication systems and, specifically, to electronic messaging and answering systems.

BACKGROUND OF THE INVENTION

One of the most recent and popular developments in the area of real-time communication systems has been the evolution of Internet instant messaging systems. These systems enable a plurality of users to communicate with their "buddies" across a computer network by sending instant text messages back and forth in real time. Popular instant messaging systems such as MICROSOFT NETWORK INSTANT MESSENGER (MSN MESSENGER) and AMERICA ON LINE INSTANT MESSENGER (AOL MESSENGER) incorporate similar methods, wherein an individual user creates a personal "buddy list" of "buddies" to whom the user desires to send instant messages. "Buddies" are merely other users that are members of the computer network and therefore available for instant messaging communication. The "buddy list" displays buddy availability information from which a user determines if a particular buddy is available for instant messaging. If a buddy is available for instant messaging, the user is then able to communicate with their buddy via real time text messages.

Instant messaging systems typically require an individual user to download and install instant messenger client software which is used to establish a client-server session with a central instant messaging server. Each user registers a unique user name with the central instant messaging server, which name is used by the server to monitor the availability status of the user for the instant messaging system, as well as send instant messages to the user. Users also enter the unique user names of other users in order to create their buddy list, receive availability information about their buddies, and communicate with their buddies.

When a user connects to the network and runs the client software, the user logs into the central server system using the user's unique user name, thereby announcing the user's availability to other users for instant messaging. The central server then examines the user's buddy list and determines which of the user's buddies are also online and available for instant messaging. This information about buddy availability which is presented to the user is known as "presence information." Typical presence information displayed to a user includes information such as whether a buddy is online and available for communication, whether a buddy is online but unavailable for communication, and whether a buddy is offline.

The central server system sends presence information about the user's buddies to the user client software, which displays this presence information to the user. The user examines this presence information to determine which buddies are available and unavailable for instant message communication. In addition, by connecting to the instant messaging server system, the server system is able to determine the user's availability status, such as online, online but unavailable, and offline. This presence information is displayed to those individuals that have designated the user as their buddy. These individuals are thus able to initiate instant messaging with the user, just as the user is able to initiate instant messaging with their buddies.

Although current instant messaging systems incorporate presence information that is displayed to individual users, these systems are limited in a number of ways. First, the user buddy list is pre-defined and static, meaning that a user must know the unique user name for those buddies they want to add to their buddy list. In addition, the user's buddy list will remain unchanged unless the user manually makes modifications to the list, and contact entities the user may designate as a buddy are limited to people, because other entities such as computer systems are not incorporated into or monitored by the client-server system.

Furthermore, there are numerous privacy issues regarding current instant messaging systems. Some instant messaging systems do not limit the extent that user status information is shared, such that anyone may designate another user as their buddy and monitor their availability without the individual's knowledge or approval. This is sometimes undesirable, and some instant messaging systems have attempted to deal with this problem by requiring user permission to be included on another user's buddy list. This solution is limited, however, because it imposes the additional front-end limitation on establishing initial communication with those buddies of which the user has prior knowledge. In other words, requiring user permission for inclusion on another user's buddy list may prevent the user from finding and communicating with buddies to whom the user has no objection, but who remain unknown due to the constraint of user permission.

The limited amount of presence information a user can handle is yet another limitation of current instant messaging systems. Server systems are unable to provide every user with the presence information for every other user simultaneously, and therefore current instant messaging systems rely on the static buddy entry process and buddy list method to limit the presence information presented to a user. This reliance on a user buddy list prevents the user from discovering and communicating with new buddies, but the system cannot present the user with information about every possible user and let the user select buddies, because the system and user cannot handle this amount of information. Thus, the absence of a dynamic filtering mechanism that enables a dynamic buddy list while preventing the need for contact information on every potential buddy limits current instant messaging systems.

The manual status mechanism used to determine presence information is yet another limitation of current instant messaging systems. Current instant messaging systems determine user presence information based on manual user actions, such as the user logging into the server system and the user changing his or her availability status directly through computer input. These manual processes are inherently unreliable, however, and often lead a user to believe another individual is available when they are not, and vice versa.

One common situation that exemplifies the manual status mechanism problem described above is a "messaging tag," wherein users repeatedly attempt to contact each other by sending text messages, but never communicate directly in real-time. For instance, when a buddy becomes unavailable but fails to change his or her presence information from "online and available" to "online but unavailable," a user may attempt to communicate in real-time with the buddy under the mistaken impression that the buddy is available. Instead of communicating with their buddy, however, the user instead sends a non-real time message that is unanswered. When the buddy returns and finds the message, the buddy may still believe the user is online and attempt to return a message to the user. The user is often unavailable at that point, however, and the buddy's message is also sent in non-real time and is never read by the user. This self-perpetuating process continues until the user and buddy finally communicate in real-time or give up.

This messaging tag problem is not limited to the communication medium of instant messaging systems, but is a problem in other communication media, such as telephone and e-mail communications, wherein presence information is either altogether unavailable, unreliable, or available in only a limited amount. Thus, not only is accurate presence information desirable in the medium of instant messaging, but it is also desirable in other media such as telephone and e-mail communication where users desire to know the status of their messages and presence information about a message recipient.

SUMMARY OF THE INVENTION

These and other deficiencies in instant messaging systems, as well as other communication systems that lack presence information, are addressed by the present invention, which is a method and apparatus for creating a presence monitoring contact list with dynamic membership, herein referred to as a "dynamic contact list." This dynamic contact list includes contact information about contact events in the case of a calling party unsuccessfully attempting to communicate with a called party, as well as presence information about the availability of calling parties that attempt to communicate with the called party. The called party uses the dynamic contact list information to determine what, when, why, and how calling parties attempted to communicate with the called party, and the availability status of calling parties for return communication by the called party.

Calling parties are entities that initiate communication with a called party, and called parties are entities that are intended recipients of calling party communication. Both calling and called parties include individuals, computers, and computer systems that communicate with other entities. For example, in the instant messaging context, the calling party includes the user that initially sends an instant message, and the called party includes the buddy to which the user sent the message. More broadly, in the general network and telecommunication context, calling and called parties include individuals, computers, and computer systems that manually or automatically communicate information to other entities, via any communication network or medium.

A contact event occurs when a calling party unsuccessfully attempts to communicate with a called party via a communication media. Communication media include analog and digital communication channels and networks used by calling parties to communicate with called parties. Thus, contact events include communication mechanisms such as e-mail, instant messaging, telephone, and faxes. For example, in the internet messaging context, a contact event occurs when a user attempts to instant message with a buddy who is unavailable or fails to answer. Similarly, in the telecommunication context, a contact event occurs when an individual, computer, or computer system unsuccessfully attempts to call or communicate with another individual, computer, or computer system that does not answer the call or communication.

The dynamic contact list displays contact information as a list of dynamic contact entries. Dynamic contact entries may be generated for each contact event that occurs, or may be generated according to certain criteria including particular calling agents, contact event times, and contact media. Each dynamic contact entry includes contact information about what, when, why, and how a calling party attempted to communicate with the called party. This information may be listed separately according to each contact event, or grouped together according to certain criteria including the calling party, contact event times, and contact media. In addition, the called party may have a "screen saver" option, wherein calling parties can leave detailed contact information to supplement the contact information automatically generated from the contact event itself.

The dynamic contact list also displays presence information about the availability of calling parties that attempted to communicate with the called party. This presence information lists the present and/or future availability of calling parties for communication with the called party, and is generated by monitoring calling party availability. In addition to the traditional static presence monitoring, wherein a calling party manually changes their availability status, presence monitoring is also dynamic, wherein a calling party's availability is automatically determined based on information sources other than direct calling party input. For example, an individual's presence information may be dynamically generated by examining their calendar, daily schedule, or itinerary to automatically determine when a user is and/or will be available for communication.

In order to ensure privacy, entities that initiate communication with the user may be given the option to opt out of being listed as a contact event, opt out of subsequent presence monitoring, or both. This ability to opt out may be a blanket preference indicated by the calling party, or chosen by the calling party on a per communication or per called party basis.

The apparatus used to implement the present invention is a client-server system. The client-server system includes a call routing processor and presence processor which determine when entities attempt to communicate with other entities and when entities are available for communication, respectively. When a calling party unsuccessfully attempts to communicate with a called party, the routing processor reports the communication attempt to the called party data terminal, thereby notifying the called party of the contact event by creating a new contact event entry in the dynamic contact event list.

The routing processor also communicates with the presence processor and notifies it of the contact event. The presence processor then determines the presence status of the calling party, which is displayed to the called party, thereby notifying the called party with presence information about the calling party. The presence processor continues to monitor the presence status of the calling party and reports any changes in the presence status of the calling party to the call routing processor. The call routing processor forwards this updated presence information to the called party, thereby updating the called party with the most recent presence information about the calling party.

BRIEF DESCRIPTION OF THE DRAWINGS

The foregoing and other features of the present invention will be more readily apparent from the following detailed description and drawings of illustrative embodiments of the invention in which.

DETAILED DESCRIPTION

Figure 1:
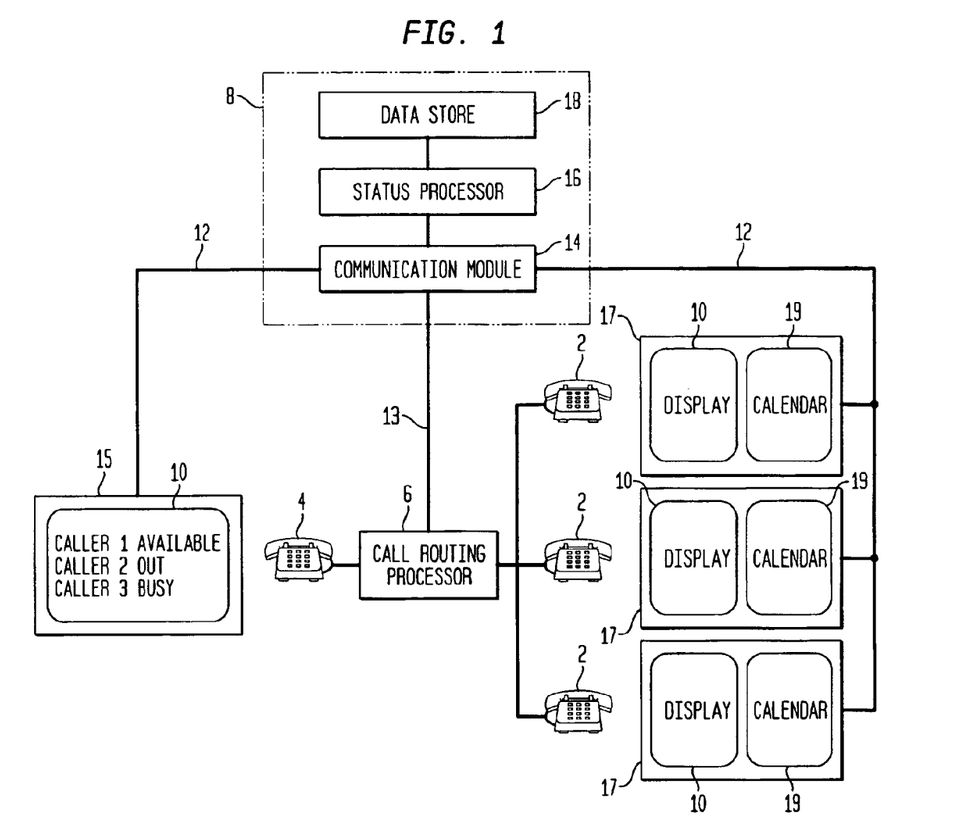
FIG. 1 is a block diagram of one illustrative embodiment of our invention.

Referring now to FIG. 1, therein is shown a system in accordance with this invention and including a plurality of calling parties 2 that are networked to a plurality of called parties 4, of which one such called party is depicted. The system also includes a call routing processor 6 that generates contact information for contact events by monitoring calls placed by the calling parties 2 to a called party 4, and a presence processor 8 that generates presence information for the calling parties 2 by monitoring and determining the presence status of the calling parties 2. The system further includes a data terminal 15 which includes a dynamic contact list display 10 for each called party 4 and a data terminal 17 which includes a dynamic contact list display 10 for each calling party 4.

It should be understood that if a single entity has been the target of a contact event as a called party 4 that unsuccessfully received a call from a calling party 2, and the source of a contact event as a calling party 2 that unsuccessfully initiated a call with a called party 4, then that single entity is both a called party 4 and a calling party 2, respectively. In other words, a single entity is not limited to being either a calling party 2 or a called party 4, but may be both. It should also be understood that the call routing processor 6 and presence processor 8 may simultaneously generate contact and presence information for multiple contact events and calling parties 2, respectively. It should further be understood that the functions of the call routing processor 6 and presence processor 8 may be implemented within a single processor, or implemented by a plurality of processors, servers, or agents that perform the call routing and presence functions.

When a calling party 2 attempts to communicate with a called party 4, the call routing processor 6 monitors the call to determine whether or not the calling party 2 successfully communicated with the called party 4. Where the communication attempt is unsuccessful, the call routing processor 6 determines that a contact event has occurred, because the calling party 2 did not successfully communicate with the called party 4. After determining that a contact event has occurred, the call routing processor 6 determines relevant contact information about the contact event, including the calling party 2, called party 4, time of the contact event, and purpose of the call. The call routing processor 6 then sends this contact information to the called party 4, and the contact information is displayed to the called party 4 via its dynamic contact list 10 at its data terminal 15.

After determining that a contact event has occurred, the call routing processor 6 also communicates with the presence processor 8 and notifies it about the contact event between the calling party 2 and the called party 4. The presence processor 8 receives this information about the contact event and begins to monitor and determine the presence status of the calling party 2 so long as the presence processor 8 has the appropriate permission to do so. As the presence processor 8 determines the presence status of the calling party 2, it sends this presence information to the called party 4, and the presence information is displayed to the called party via its data terminal 15 dynamic contact list 10. Whenever the presence processor 8 determines a change has occurred in the presence status of the calling party 2, it sends the updated presence Information to the called party 4, thereby updating it with the most recent presence information for the calling party 2.

Upon examination of its dynamic contact list, the called party 4 is able to determine from the contact information included in the dynamic contact list what contact events have occurred in its absence, including the calling party 2, time of the call, and purpose of the call. Upon examination of its dynamic contact list, the called party 4 is also able to determine from the presence information included in the dynamic contact list the presence status of calling parties 2, including if, when, and for how long calling parties 2 are available for return communication by the called party 4.

In accordance with an aspect of the invention, the presence processor 8 collects presence data about the calling parties, processes this presence data to determine the presence information for calling parties, and distributes this presence information to called parties. This presence information is displayed to a called party 4 via its dynamic contact list 10 at its data terminal 15, thereby enabling the called party to determine if, when, and for how long calling parties are available for return communication by the called party.

The presence processor 8 performs the presence data collection, processing, and distribution functions; a plurality of network connections 12 are used to communicate with calling parties 2 and called parties 4, and connection 13 communicates with the call routing processor 6. The presence processor 8 also includes a communication module 14, which accumulates raw presence data and contact event data from calling parties and call routing processor 6 and distributes presence information to the called party 4; a status processor 16, which processes contact event data and presence data to determine what calling parties need to be monitored and the presence information for those calling parties, respectively; and a data store or database 18, which stores contact event data and presence data for processing by the status processor 16, and presence information for distribution by the communication module 14.

Whenever a contact event occurs, the call routing processor 6 communicates with the presence processor 8 via its network connection 13 to send information about the contact event, including the calling party that attempted to communicate with the called party, and the called party that was the intended target of the calling party communication. This information is stored in the database 18, which records the calling and called parties for contact events. Thus, the status processor 16 is able to determine what calling parties should be monitored, and what called parties should receive presence information about specific calling parties, from the contact event data stored in the presence database 18.

For each calling party included in the presence database 18, the status processor 16 collects presence data about the calling party 2 via the network connections 12, which data is received through the communication module 14. This presence data may be simple real-time presence data such as "online and available," "online and unavailable" and "offline," or complex non-real-time presence data such as the calling party's agenda, schedule, time limit for monitoring, and privacy limits when monitoring the calling party which can be obtained from the calling party or various utilities associated with the calling party. The status processor 16 processes this presence data to determine relevant presence information for the calling party 2. Presence data or processed presence information may also be stored in the presence database 18 for later processing by the status processor 16 and distribution by the communication module 14, respectively.

After determining the presence information for the calling party 2, the presence processor 8 is able to determine those called parties 4 that should receive this information using the contact event data stored in the presence database 18. The status processor 16 then communicates the presence information for the calling party 2 to the appropriate called parties 4 via the network connections 12, thereby notifying them of the presence status of the calling party 2. The presence information communicated can once again be simple, real-time information such as "online and available," "online but unavailable," and "offline," or complex non-real-time presence information such as a range of availability and unavailability times and future presence information for the calling party 2. Whenever the presence processor 8 determines that the presence information for the calling party 2 has changed, it communicates the new presence information to the appropriate called parties 4, thereby updating the presence information for the calling party 2.

By displaying the presence information communicated by the presence processor 8 for a plurality of calling entities via the dynamic contact lists 10 at the called parties' data terminals 15, called parties 4 can determine the availability of calling parties 2 and prioritize if, when, and how to return communicate with calling parties. In particular, the presence information included in the dynamic contact list for those calling parties 2 that initiated contact events enable the called party 4 to determine what calling parties 2 are still available, when calling parties 2 will become available or unavailable, and how the called party 4 can communicate with the calling parties 2. For example, the dynamic contact list may display an availability schedule for each of the calling parties 2, thereby allowing the called party 4 to compare the schedules and determine which calling parties 2 will be available in a limited time span and require return communication at a particular time, versus which calling parties 2 are available for a longer period of time and are therefore of a lower priority for return communication by the called party 4.

In order to ensure an appropriate level of privacy for a calling party 2, the presence processor 8 may permit each calling party 2 to opt out of monitoring by the presence management processor 28. The option to opt out may be set as the default choice for a calling party 2, or the calling party 2 may opt out of presence monitoring by the presence management processor 28 based on certain factors including a call-by-call, called-party-by-called-party, or time-period basis. Thus, although there is no front-end limitation that requires a called party 4 to know the identity of each calling party 2 ahead of time in order to monitor the calling party's presence status, there is still the ability for the calling party 2 to selectively opt out in those situations where it wishes to maintain its privacy, but also the ability to allow previously unknown called parties 4 to monitor the presence status of previously unknown calling parties 2.

The service available in a system in accordance with the invention can also provide various enhancements. Thus, the system may be enhanced by allowing calling parties 2 to use the text messaging capabilities of standard input messaging systems to deliver a text message to the data terminal of the called party 4; this text message could also be displayed at the called party's contact list display 10. Another enhancement of this system involves a scheduling application, wherein each data terminal 17 at a calling party 2 includes a scheduling calendar 19. This calendar 19 provides the presence processor 8 with information about how long a calling party 2 is likely to remain in its current state. Thus, for each of the calling parties 2 using a scheduling calendar 19, information is provided based on both a current status and schedule. For example, the status of calling parties 2 who are away at a scheduled event can be enhanced to indicate when they might return, and the status of calling parties 2 who are available now can be enhanced with information as to when their next scheduled event will make them unavailable.

Figure 2:
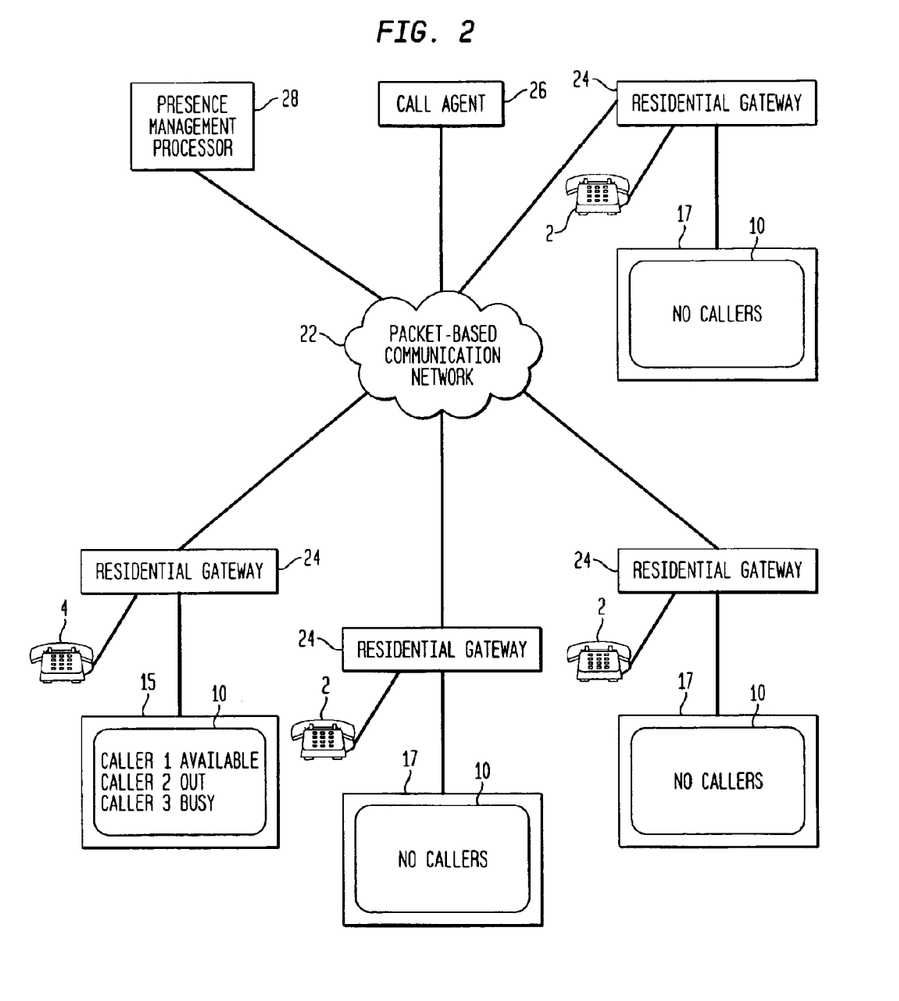
FIG. 2 is a block diagram of a packet-based embodiment of our invention.

Referring now to FIG. 2, therein is shown a packet-based system illustrative of another embodiment of the present invention. A packet-based system utilizes data packets that communicate the message from the calling party to the called party, as well as data packets that are not part of the message itself, but include contact and presence information about contact events and calling parties, respectively, which are sent to the appropriate called parties by the call agent and presence management processor, respectively.

The packet-based system shown in FIG. 2 includes a plurality of calling parties 2 and called parties 4 that are connected to a packet-based communication network 22 via residential gateways 24. This packet-based system also includes the plurality of data terminals 15 and 17 having the dynamic contact list displays 10. The packet-based system further includes a call agent 26 that performs the call routing functions of a call routing processor 6, and a presence management processor 28 that performs the functions of a presence processor 8. All communications, including those between user terminals 15 and 17 and the presence management processor 28, those between telephones 2 and telephone 4, those between the call agent 26 and the presence management processor 28, and those between telephones 2 and 4 and the call agent 26 are carried over the packet-based network 22.

Calling parties 2 attempt to communicate with called parties 4 via the packet-based communication network 22. The calling parties 2 access the packet-based communication network 22 via their corresponding residential gateways 24, and attempt to send their messages via data packets that are routed from the calling parties 2 through the packet-based communication network 22 to the called parties 4, which also access the packet-based communication network 22 via their residential gateway 24.

When a calling party 2 fails to communicate with the called party 4, the presence management processor 28 determines that a contact event has occurred, determines the appropriate contact information for the contact event, and communicates the contact information to the called party 4. The presence management processor 28 monitors and determines the presence status of the calling party 2, and communicates this presence information to the called party 4. Both the contact information and the presence information sent to the called party 4 are in the form of data packets that are routed from the presence management processor 28 to the called party 4 via the packet-based communication network 22.

The dynamic contact list 10 of the called party 4 displays this contact and presence information, thereby allowing the called party 4 to determine the calling parties 2 that attempted to communicate with the called party 4 while the called party 4 was unavailable, as well as allowing the called party 4 to determine the availability status of the calling party 2. Thus, the called party 4 can determine if, when, and how to return communicate with a calling party 2.

Figure 3:
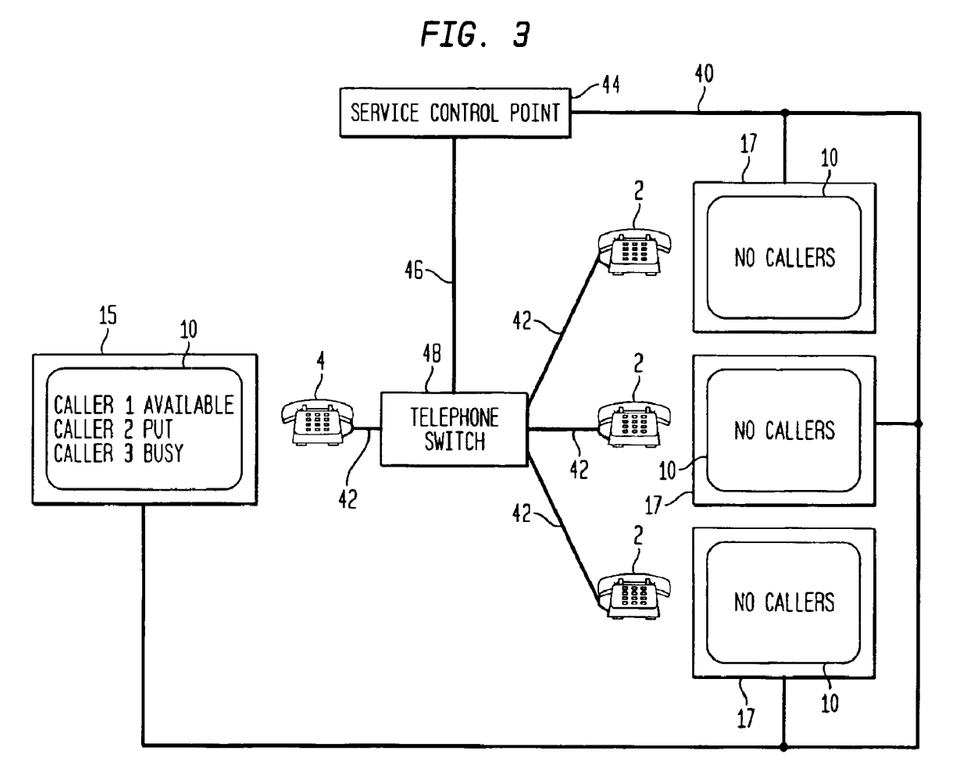
FIG. 3 is a block diagram of a circuit switched embodiment of our invention.

Referring now to FIG. 3, therein is shown a third, illustrative embodiment which is a circuit based system, including a switched telephone network 48 that performs the routing function and is used by calling parties 2 to communicate with called parties 4, and a separate packet-based signaling network 40 used to communicate contact and presence information to called parties 4 from the call agent and presence management processor, respectively.

In a circuit based system, communications between the telephones 2 and 4 are carried over lines 42 of the switched telephone network through one or more telephone switches 48. The presence management functions in a circuit based system are performed in a telephone service control point 44, and communication between a telephone switch 48 and service control point 44 is carried out over a signaling network 46 such as a SS7 network. The communications between a service control point 44 and the calling party and called party data terminals 15 and 17 are carried over a separate packet-based network 40. In an alternative embodiment, however, the service control point 44 can also communicate with calling and called party data terminals 15 and 17 using the switched telephone network, in which case the communication is by in-band signaling methods, such as used for delivery of caller identification information.

The circuit switched system shown in FIG. 3 includes a plurality of calling parties 2 that attempt to communicate with called parties 4 via the telephone switch network 48. The circuit switched system also includes a signaling network 46 such as SS7 used to setup communications between calling parties 2 and called parties 4. The circuit switched system further includes a service control point 44 that monitors calling parties 2, determines their presence information, and communicates their presence information to called parties 4, and a packet-based network 40 used by the service control point 44 to send data to the data terminals 15 and 17.

When a calling party 2 attempts to communicate with a called party 4, the calling party 2 attempts to establish a communication channel via telephone switch 48 If the attempt to establish a communication channel fails, a contact event occurs, and the service control point 44 communicates the appropriate contact information to the called party 4. The service control point 44 also monitors the calling party 2 to determine its presence information and sends that presence information to the called party 4.

The service control point 44 determines the presence information for the calling party 2 by retrieving presence data from the telephone switch 48 and from the data terminal 17 of the calling party 2, processes the presence data to determine the presence information for the calling party 2, and communicates the presence information to the called party 4. The contact and presence information sent to the called party 4 data terminal 15 is in the form of data packets that are routed from the service control point 44 over the packet-based network 40 to the called party 4.

The dynamic contact list 10 at the called party 4 displays this contact and presence information, thereby allowing the called party 4 to determine the calling parties 2 that attempted to communicate with the called party 4 while the called party 4 was unavailable, as well as allowing the called party 4 to determine the availability status of the calling party 2. Thus, the called party 4 can determine if, when, and how to return communicate with a calling party 2.

A number of features of the present invention will be apparent to one skilled in the art. One such feature is the ability to generate presence information from a source other than presence data retrieved directly from the calling party that initiated a contact event. For instance, a central server system may include the schedules and agendas for a plurality of calling parties, and the presence management processor may use this central presence data source to determine presence information for a plurality of calling parties without directly contacting the calling parties themselves. In the alternative, for a multi-stage communication process wherein an intermediate stage such as an Internet Service Provider may block the availability of a calling party, the presence management processor can determine and report that a calling party is unavailable due to a call block at an intermediate stage, rather than because the calling party itself is unavailable.

Another feature of the present invention is the ability to provide the calling party with the ability to provide additional contact and presence information when a contact event occurs, thereby allowing the calling party to directly inform the called party about relevant contact and presence information. For instance, the calling party may notify the called party of other communication channels and entities where the called party can be contacted for return communication, as well as the time period for which the calling party will be available at these locations. The calling party can also notify the presence monitoring system itself of alternative entities to monitor as a substitute for the calling party so that the called party can return communicate the calling party using another channel or entity. For instance, a calling party that initiates a contact event using their office phone may notify the presence management processor to monitor the calling party's cellular phone instead of its office phone, thereby allowing the calling party to specify the entity that the presence management processor should monitor, generate presence information, and report to the called party.

While the invention has been particularly shown and described with reference to preferred embodiments thereof, it will be understood by those skilled in the art that various changes in form and details may be made therein without departing from the spirit and scope of the invention.

I claim:

1. A communication system for advising an intended called party recipient of the availability of a calling party sender for return messages, said system comprising:

a data terminal associated with each of said calling and called parties, a message routing module for interconnecting said calling and called parties; and a presence processor connected to said data terminal of said calling and called parties and obtaining from a calling party descriptive information and availability status information of said calling party, said message routing module communicating with said presence processor in response to said calling party not completing a call to said called party and said presence processor in response thereto forwarding to the data terminal of said called party said descriptive information and said availability status information of said calling party.

2. The communication system in accordance with claim 1, wherein said presence processor includes circuitry for communicating with said data terminals and said message routing module, a datastore for storing status information, and status processor.

3. The communication system in accordance with claim 1 wherein said communication system is a telephone system.

4. The communication system in accordance with claim 3, wherein said message routing module is a call agent.

5. The communication system in accordance with claim 4, wherein communications between said call agent, said presence processor, and said calling and called parties, including said data terminals, are through a packet-based communication network.

6. The communication system in accordance with claim 5, further including a residential gateway between each of said calling and called parties and said packet-based communication network.

7. The communication system in accordance with claim 6, further including a packet based network connecting said service control point to said data terminals of said calling and called parties.

8. The communication system in accordance with claim 3, wherein said message routing module is a telephone switch and said presence processor is a service control point.

9. The communication system in accordance with claim 1, wherein said data terminal includes a scheduling calendar, said presence processor obtaining said availability status information from said scheduling calendar.

10. The communication system in accordance with claim 1, wherein said availability status information indicates the calling party's availability for return communication from the called party.

11. The communication system in accordance with claim 1, wherein said presence processor is operative to dynamically update said availability status information.

* * * * *

UNITED STATES PATENT AND TRADEMARK OFFICE
CERTIFICATE OF CORRECTION

PATENT NO. : 6,968,052 B2
DATED : November 22, 2005
INVENTOR(S) : John R. Wuller, II It is certified that error appears in the above-identified patent and that said Letters Patent is hereby corrected as shown below:

<u>Title page,</u>
Item [73], Assignee, change "Telecordia" to -- Telcordia --.

Signed and Sealed this

Second Day of May, 2006

JON W. DUDAS
*Director of the United States Patent and Trademark Office*